Patented Aug. 29, 1944

2,357,125

UNITED STATES PATENT OFFICE 2,357,125

LIGHT METAL FLUX

Mike A. Miller, New Kensington, Pa., assignor to Aluminum Company of America, Pittsburgh, Pa., a corporation of Pennsylvania No Drawing. Application November 25, 1941, Serial No. 420,345

9 Claims. (Cl. 148—26)

This invention relates to the welding and brazing of light metal members, and it is particularly concerned with the provision of an improved flux for use in such operations. By the term "light metals" I mean to include aluminum and magnesium as well as the alloys wherein these metals, or either of them, constitute at least 50 per cent by weight of the entire composition.

In order to satisfactorily join light metal members by the fusion of metal therebetween, it has been found necessary to first remove the adherent oxide film which naturally forms on the surfaces of such members when they are exposed to the atmosphere. A flux containing alkali halides is usually employed to accomplish this purpose since the flux, having removed the coating, will adhere to the cleansed surface and so protect it against oxidation during the remainder of the joining operation.

The efficacy with which the various alkali halide fluxes will remove the oxide coating varies widely depending upon the composition of the flux. A flux which will effect a substantially complete removal of the coating in a relatively short period of time is the most desirable and is termed a flux of high activity. One of the most important factors determinative of such activity is the wetting power of the flux, i. e. the ability of the flux to come into intimate contact with every portion of the oxide coating covered by the flux, and the metal underlying it. The relative wetting power of different fluxes is manifested in several ways, among them being the difference in the area covered by the molten fluxes under comparable conditions.

A type of flux which has extensive application in the art of joining light metals is one at least 50 per cent of which consists of the chlorides of the alkali metals sodium, potassium and lithium. Fluxes of this type are herein referred to as "alkali metal chloride base" fluxes. Generally, though not always, one or more of the fluorides of sodium, potassium or lithium, or a complex fluoride such as cryolite or chiolite, is included in the flux. Other substances have also been added upon occasion to impart certain desired properties for particular joining operations.

While suitable welding and brazing fluxes for light metals may be selected from the broad range mentioned above, it should be clearly borne in mind that such fluxes are not interchangeable. A suitable welding flux, in addition to other desired properties, must have a melting point which is not far below the melting point of the metal members being joined since in welding a portion of such member is actually fused and makes up a part of the metal forming the joint. In brazing, on the other hand, somewhat lower temperatures are employed, and practically none of the parent metal becomes fused.

Fluxes of the general composition recited above, while satisfactory in many respects, do not in many cases adequately remove the oxide coating over a large enough area and with sufficient rapidity to meet the demands of many modern high speed operations. In other words, such fluxes have been deficient with respect to activity. In some cases, notably in welding operations, it has been possible to compensate in part for such deficiency by increased mechanical agitation. On the other hand, the nature of many joining operations is such that the action of the flux may not be so assisted, and these operations, accordingly, have been particularly time consuming.

In an effort to improve the activity of the fluxes described above, it has been proposed to introduce varying quantities of heavy metal salts such as zinc chloride. Such a procedure as this has generally been found to be of more utility with brazing than with welding fluxes. However, under some conditions, the hazard of corrosion makes it advisable to reduce or altogether to eliminate this heavy metal component.

It is an object of this invention to provide an alkali metal chloride base flux of high activity and wetting power for joining light metal members. A particular object is to supply an active light metal welding flux which will simplify and speed up the welding operation. Another object is to supply an active light metal brazing flux to which no heavy metal salts need be added or in which the content of heavy metal salt may be materially reduced. A still further object is to obtain an active light metal brazing flux which may be employed in any of the various types of brazing operations including furnace, dip, induction, and torch brazing.

The attainment of these objects rests on the discovery that the addition of at least one strontium halide to an alkali metal chloride base flux increases the wetting power, and consequently the activity, of the flux. By the term "strontium halide," I mean the group of salts, strontium chloride, strontium fluoride, strontium bromide and strontium iodide. The wetting action of the strontium halides is markedly superior to that of the halides of the other alkaline earth metals usually associated with strontium.

When one or more of the strontium halides are added to a welding flux, it spreads out over a wider surface area and more rapidly removes the oxide coating therefrom than the same flux without the strontium halide addition, and as a result no particular skill is necessary to sweep the molten flux-oxide mixture ahead of the welding operation. Furthermore, the flux still retains sufficient body not to be swept away by the flame of the torch. This immensely simplifies the welding operation and appreciably speeds it up since the weld may be carried along as fast as the torch or other heating medium is able to melt the joining metal.

With respect to brazing, by the addition of strontium halides in proper amount to an alkali metal chloride base flux of suitable composition, one obtains a new and improved flux which may be used in any of the various types of brazing operations including furnace brazing, induction brazing, torch and dip brazing. The increased wetting power which characterizes such strontium halide containing fluxes, as compared to those without said halide addition, makes it possible to reduce or to eliminate any content of heavy metal salt, when this is desirable, without any sacrifice in the activity of the flux.

I have found that a satisfactory range for the strontium halide component of the flux is about 2 to 15 per cent by weight of the entire flux, although a preferred range is from about 5 to 12 per cent. This strontium halide component may be made up of one or more of the strontium halide salts, but the total amount of such component present in the flux should fall within this range. In the case of strontium fluoride, it will sometimes be found desirable to limit the addition to not more than about 6 per cent by weight since this substance, as distinguished from the other strontium halides, has a tendency to raise the melting point of the flux rather sharply. It has generally been found desirable to employ strontium chloride rather than the other strontium halides chiefly because this salt has less effect on the melting point of the mixture than does the fluoride, and it is more stable than are either the bromide or the iodide.

According to my tests, it is not desirable to add amounts of strontium halide in excess of 15 per cent since such further additions do not appear to be of any further benefit and indeed often impair the action of the flux. This is particularly noticeable in dip brazing operations where it has been my observation that the addition of larger amounts of strontium halide acts to form a deposit on the metal surfaces which interferes with the flow of the molten brazing metal. Again, larger amounts of strontium halide often have the effect of raising the melting point of the flux, thus impairing its utility for many joining operations with light metal members. On the other hand, if less than 2 per cent of strontium halide is present, there is generally little increase in wetting power.

Where a fluoride component is required in an alkali metal chloride base flux, it is usually a fluoride of one of the metals sodium, potassium or lithium, or of such double fluorides as croyolite and chiolite, or mixtures of such fluorides. As far as the present invention is concerned, these fluorides are chemically and physically closely related substances that perform a similar function in the flux, and are therefore considered as constituting the group herein referred to as the "alkali fluorides." However, other fluoride materials than these may be employed. The total amount of the alkali fluoride addition will usually range from about 3 to 40 per cent by weight of the flux. In those brazing operations where it is desirable to employ little or no heavy metal salts, it is preferable that the fluoride be a complex fluoride such as cryolite or chiolite. These salts are usually added within the range of about 3 to 25 per cent. If another alkali fluoride be added, it should comprise about 0.5 to 15 per cent by weight of the flux.

The physical properties of the flux are in large part determined by the alkali metal chloride component since this portion generally constitutes at least 50 per cent by weight of the entire flux. The salts making up this component of the flux should be adjusted to provide the proper melting point for use with the particular metal and type of joining operation being employed. The flux composition in all cases should be one which will melt before the filler metal fuses. Fluxes made up in large part of the alkali metal chlorides have been found especially adaptable for welding and brazing light metals because of their stable and non-oxidizing properties, and the wide melting point range of their mixtures. The chlorides of sodium, potassium and lithium constitute what are herein referred to as the alkali metal chloride group because of their close chemical and physical relationship and similarity of function in the fluxes. It has been my experience that at least two of these materials should be employed in an alkali metal chloride base flux within the approximate percentage range in terms of the weight of the entire flux of 5 to 60 per cent sodium chloride, 5 to 60 per cent potassium chloride and 5 to 80 per cent lithium chloride, the total amount of these chlorides, in any case, exceeding 50 per cent of the weight of the flux.

As illustrative of particular embodiments of this invention, two preferred flux compositions which I have found especially suitable in the welding of light metals are: (1) for welding aluminum; 44% NaCl, 44% KCl, 7% $SrCl_2$, 5% $KHSO_4$ (2) for welding magnesium: 42.5% NaCl, 42.5% KCl, 10% $SrCl_2$, 5% LiF.

Similarly, two flux compositions which I have found to be well adapted for use in any of the various types of brazing light metals have the compositions: (1) for brazing aluminum: 25% NaCl, 36% KCl, 20% LiCl, 6% $SrCl_2$, 12% Cryolite, 1% KF; (2) for brazing magnesium: 35% NaCl, 35% KCl, 20% LiCl, 5% $SrCl_2$, 5% LiF.

Flux compositions containing strontium halides may be handled in the usual manner and may be employed with the conventional types of filler metals used for joining light metal articles.

An illustration of the improved results obtained through use of a strontium halide containing welding flux is found in the following example. Two strips of aluminum, 0.064 inch in thickness, were butt welded along one longitudinal edge by means of an oxy-hydrogen flame and an aluminum filler rod coated with a flux paste. The edges of the strips were held together, and the bond was made by passing a flame along the juxtaposed edges while simultaneously feeding flux-coated filler rod metal into the flame to form a bead. The filler rod was coated with flux by dipping it into a water paste of flux shortly before making the weld. In this test, two fluxes were employed, one composed of 47.5 per cent sodium chloride, 47.5 per cent potassium chloride, and 5 per cent potassium bisulphate, while the other contained about 7 per cent strontium chloride in addition to, and with proportionate decreases in, the compounds given for the first flux. Approximately the same amount of flux was used in both cases while the rate at which the welding flame was advanced and the flame temperature were held as nearly constant as possible. As the welding operation was being carried out, it was observed that the first flux spread out to a distance of but 0.25 inch, whereas the second spread out to a distance of about 0.5 to 1 inch. As a further result of its greater wetting power, the second flux more completely washed away the oxide near the fused metal and kept the oxide far enough from the molten metal to preclude its inclusion in the welded joint. Furthermore, the welded joint produced with the flux containing strontium chloride was clean, possessed almost a mirror-like surface, and was free from pits and pores. The welded joint produced with the other flux, by way of contrast, was dull and somewhat pitted.

Having thus described my invention, I claim:

1. An alkali metal chloride base flux for joining light metal members containing about 2 to 15 per cent total of at least one strontium halide, said flux being characterized by a higher wetting power than that of the same flux devoid of said strontium halide.

2. An alkali metal chloride base flux for joining light metal members containing about 2 to 15 per cent total of at least one strontium halide, about 5 to 60 per cent sodium chloride, and about 5 to 60 per cent potassium chloride, said flux being characterized by a higher wetting power than that of the same flux devoid of said strontium halide.

3. An alkali metal chloride base flux for joining light metal members containing about 2 to 15 per cent total of at least one strontium halide, about 5 to 60 per cent sodium chloride, about 5 to 60 per cent potassium chloride, and about 5 to 80 per cent lithium chloride, said flux being characterized by a higher wetting power than that of the same flux devoid of said strontium halide.

4. An alkali metal chloride base flux for joining light metal members containing about 3 to 40 per cent total of at least one alkali fluoride, about 2 to 15 per cent total of at least one strontium halide, about 5 to 60 per cent sodium chloride, about 5 to 60 per cent potassium chloride, and about 5 to 80 per cent lithium chloride, said flux being characterized by a higher wetting power than that of the same flux devoid of said strontium halide.

5. An alkali metal chloride base flux for joining light metal members containing about 3 to 40 per cent total of at least one alkali fluoride, about 5 to 12 per cent total of at least one strontium halide, about 5 to 60 per cent sodium chloride, about 5 to 60 per cent potassium chloride, and about 5 to 80 per cent lithium chloride, said flux being characterized by a higher wetting power than that of the same flux devoid of said strontium halide.

6. An alkali metal chloride base flux for joining light metal members containing about 3 to 40 per cent total of at least one alkali fluoride, about 2 to 15 per cent strontium chloride, about 5 to 60 per cent sodium chloride, about 5 to 60 per cent potassium chloride, and about 5 to 80 per cent lithium chloride, said flux being characterized by a higher wetting power than that of the same flux devoid of said strontium chloride.

7. An alkali metal chloride base flux for joining light metal members consisting of about 3 to 40 per cent lithium fluoride, about 2 to 15 per cent strontium chloride, about 5 to 60 per cent sodium chloride, about 5 to 60 per cent potassium chloride, and about 5 to 80 per cent lithium chloride, said flux being characterized by a higher wetting power than that of the same flux devoid of said strontium chloride.

8. An alkali metal chloride base flux for joining light metal members consisting of about 3 to 25 per cent cryolite, about 0.5 to 15 per cent lithium fluoride, about 2 to 15 per cent strontium chloride, about 5 to 60 per cent sodium chloride, about 5 to 60 per cent potassium chloride, and about 5 to 80 per cent lithium chloride.

9. An alkali metal chloride base flux for joining light metal members consisting of about 3 to 25 per cent cryolite, about 0.5 to 15 per cent potassium fluoride, about 2 to 15 per cent strontium chloride, about 5 to 60 per cent sodium chloride, about 5 to 60 per cent potassium chloride, and about 5 to 80 per cent lithium chloride.

MIKE A. MILLER.